United States Patent [19]
Lazes et al.

[11] Patent Number: 5,374,133
[45] Date of Patent: Dec. 20, 1994

[54] HIGH TEMPERATURE RESISTANT FLOATING BARRIER

[75] Inventors: Richard J. Lazes, Harvey, La.; Noah F. Lazes, Charlotte, N.C.

[73] Assignee: Oil Stop, Inc., Harvey, La.

[21] Appl. No.: 175,747

[22] Filed: Dec. 30, 1993

Related U.S. Application Data

[63] Continuation-in-part of Ser. No. 19,863, Feb. 19, 1993, Pat. No. 5,346,329, which is a continuation-in-part of Ser. No. 19,030, Feb. 18, 1993, Pat. No. 5,308,191, which is a continuation-in-part of Ser. No. 933,721, Aug. 24, 1992, Pat. No. 5,312,204, which is a continuation-in-part of Ser. No. 752,002, Aug. 29, 1991, Pat. No. 5,195,844, which is a continuation of Ser. No. 638,704, Jan. 8, 1991, abandoned, which is a continuation of Ser. No. 424,158, Oct. 19, 1989, Pat. No. 5,022,785.

[51] Int. Cl.⁵ .............................. E02B 15/04
[52] U.S. Cl. ..................... 405/68; 169/50; 405/63
[58] Field of Search ............... 405/62–72; 169/49, 50

[56] References Cited

U.S. PATENT DOCUMENTS

| 3,608,316 | 9/1971 | Manuel | 405/68 |
| 3,703,811 | 11/1972 | Smith | 405/68 |
| 4,062,191 | 12/1977 | Preus | 405/72 |
| 4,573,426 | 3/1986 | Larsson | 405/68 |
| 4,605,586 | 8/1986 | Lane | 405/63 X |
| 4,624,320 | 11/1986 | Romaine | 169/50 |
| 4,956,218 | 9/1990 | Haining | 169/50 X |
| 5,238,327 | 8/1993 | Blair et al. | 405/68 |

FOREIGN PATENT DOCUMENTS

| 2249523 | 5/1992 | United Kingdom | 169/50 |

*Primary Examiner*—Dennis L. Taylor
*Attorney, Agent, or Firm*—George A. Bode

[57] ABSTRACT

A high temperature resistant oil containment boom having a protective cover, the cover comprising, in laminar combination, an outer layer of high temperature resistant metallic fabric, a first underlayer of high temperature resistant insulation, a second underlayer of a polymer-coated fabric, a third underlayer of high temperature resistant insulation and a bottom layer of a high temperature resistant polymer-coated material, the protective cover being unified by having at least the top and bottom layers secured together along their peripheral edges.

14 Claims, 9 Drawing Sheets

HIGH TEMPERATURE RESISTANT FLOATING BARRIER

This application is a continuation-in-part application of a previous application by the same inventor bearing U.S. Ser. No. 08/019,863 filed Feb. 19, 1993, now U.S. Pat. No. 5,346,329 which is a continuation-in-part application of U.S. Ser. No. 08/019,030 filed Feb. 18, 1993, now U.S. Pat. No. 5,308,191 which is a continuation-in-part application of U.S. Ser. No. 07/933,721 filed Aug. 24, 1992, now U.S. Pat. No. 5,312,204 which is a continuation-in-part application of U.S. Ser. No. 07/752,002 filed Aug. 29, 1991, (now U.S. Pat. No. 5,195,844, issued Mar. 23, 1993), which is a continuation application of U.S. Ser. No. 07/638,704 (now abandoned) filed Jan. 8, 1991, which is a continuation of U.S. Ser. No. 07/424,158 filed Oct. 19, 1989, (now U.S. Pat. No. 5,022,785, issued Jun. 11, 1991). The entirety of these previous applications are incorporated herein by reference as if set forth in full below.

BACKGROUND OF THE INVENTION

1. Field of the Invention

The present invention relates to an apparatus which creates a floating boom for collecting floatable materials, such as liquid hydrocarbons, floating on the surface of a body of water. More particularly, the apparatus of the present invention is for such a floating boom that is resistant to high temperatures or "fire proof" since in the course of containing an oil spill, the oil may be afire.

2. General Background

Some conventional "fire proof" or high temperature resistant oil booms comprise a boom encased in an insulating material and a "flame proof" cover that is high temperature resistant. Others have provided a cover blanket for conventional oil booms, the blanket being mounted onto a conventional boom thus converting it into a high temperature resistant oil containment boom.

U.S. Pat. Nos. 4,619,553 and 4,781,493 both issued to Minnesota Mining & Manufacturing Company (3M Company) on the application of E. M. Fischer and disclose a high temperature oil containment boom which allows for the in-situ burning of spilled or leaked oil during offshore oil spill cleanup, the boom having a cover blanket comprised of three layers—an outer layer of a polymer coated high temperature resistant open weave refractory fabric, a middle layer of a ceramic staple fiber refractory batt and an inner layer of a synthetic fiber, the layers being sewn together with a ceramic thread.

U.S. Pat. No. 4,537,528 issued to Shell Oil Company on the application of W. F. Simpson and discloses a "fireproof" boom having a floatation member, a skirt depending therefrom and at least two layers of heat-resistant, water-sorbent material surrounding the floatation member. The heat-resistant, water-sorbent material draws water from around the heat sensitive floatation member, forming steam in the presence of flaming pollutant and allowing only the outer layer of the heat-resistant material to become slightly singed.

U.S. Pat. No. 4,645,376 issued to Shell Western E&P, Inc., on the application of W. F. Simpson and discloses a "fireproof" boom for containing flammable pollutants on water and includes a floatation member, a heat-resistant, water-sorbent material surrounding the floatation member and a protective fence surrounding the water-sorbent material. The floatation member is a series of cylindrical metal cans held end-to-end and the heat-resistant, water-sorbent material draws water around the heat-sensitive floatation member, forming steam in the presence of flaming pollutant and allowing only the outer layer of heat resistant material to become slightly singed. The protective fence surrounding the water-sorbent material is heavy steel wire woven in continuous spirals so that when the spirals are integrated with each other a diamond-shaped mesh is formed.

U.S. Pat. No. 4,605,586 issued to Globe International, Inc., on the application of P. Lane and discloses a portable fire-resistant barrier for containment of oil spills comprising a continuous length of interwoven, high-temperature resistant yarns and metallic wires, coated with a high-temperature resistant synthetic polymeric resin. The woven fabric barrier is buoyed by fire-resistant buoys and stabilized with ballast.

However, none of these prior devices allow for inflation of the boom after a multi-layered high temperature resistant cover or blanket has been installed thereon.

SUMMARY OF THE PRESENT INVENTION

The preferred embodiment of the apparatus of the present invention solves the aforementioned problems in a straightforward and simple manner. What is provided is a boom which can be provided with a multi-layered high temperature resistant blanket and be inflated after the blanket is mounted on the boom by inflation means exterior to the blanket.

It is a further object of the present invention to provide such a boom that can be provided with such a blanket, deployed and inflated while deployed.

BRIEF DESCRIPTION OF THE DRAWING

For a further understanding of the nature and objects of the present invention, reference should be had to the following description taken in conjunction with the accompanying drawing in which like parts are given like reference numerals and, wherein.

DETAILED DESCRIPTION OF THE PREFERRED EMBODIMENT

Figure 1:
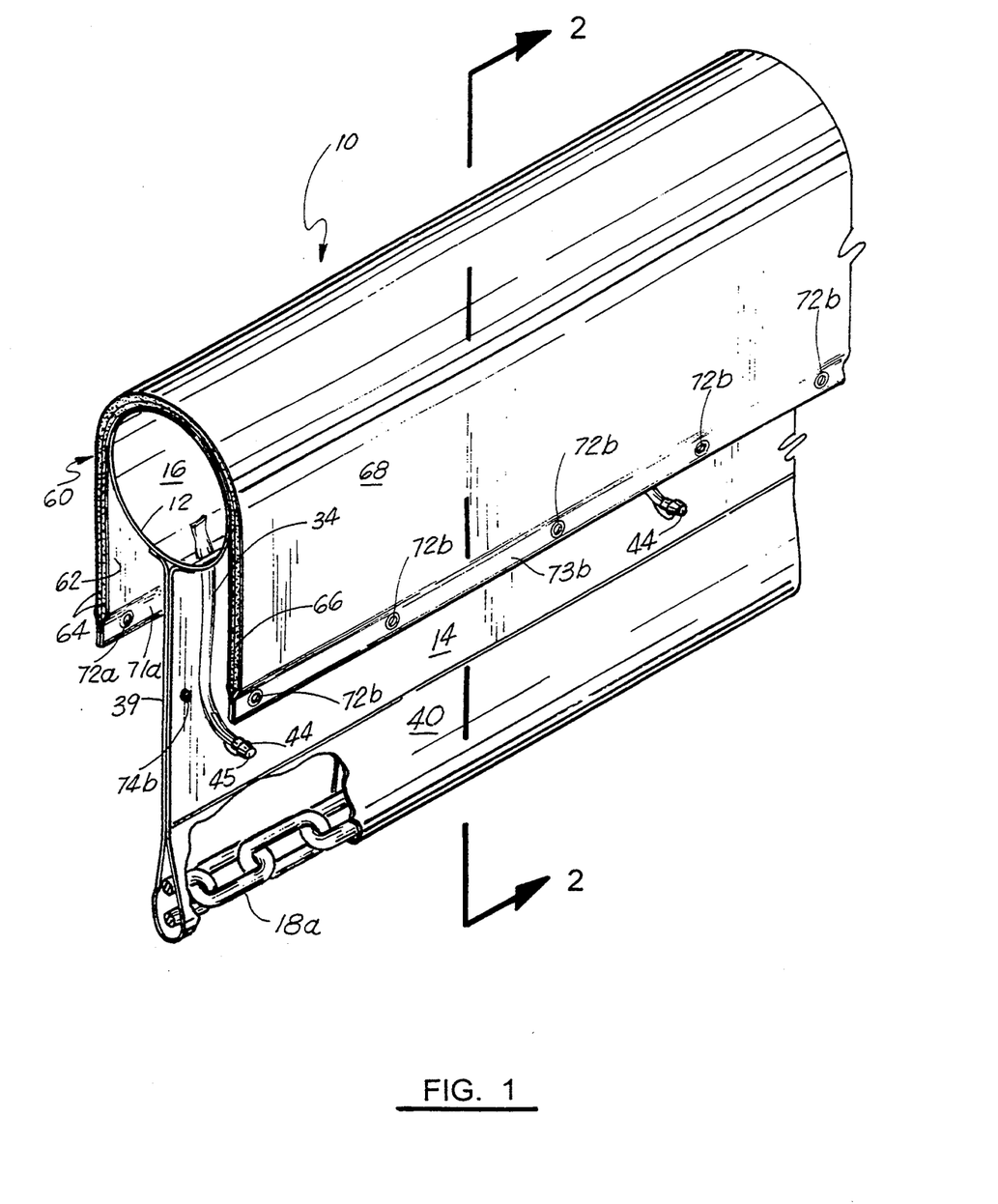
FIG. 1 is a perspective view, partially in section, of the preferred embodiment of the apparatus of the present invention, with the cover blanket being unfastened from the boom skirt and a portion of the lower sleeve cut-away.
Figures 2, 3:
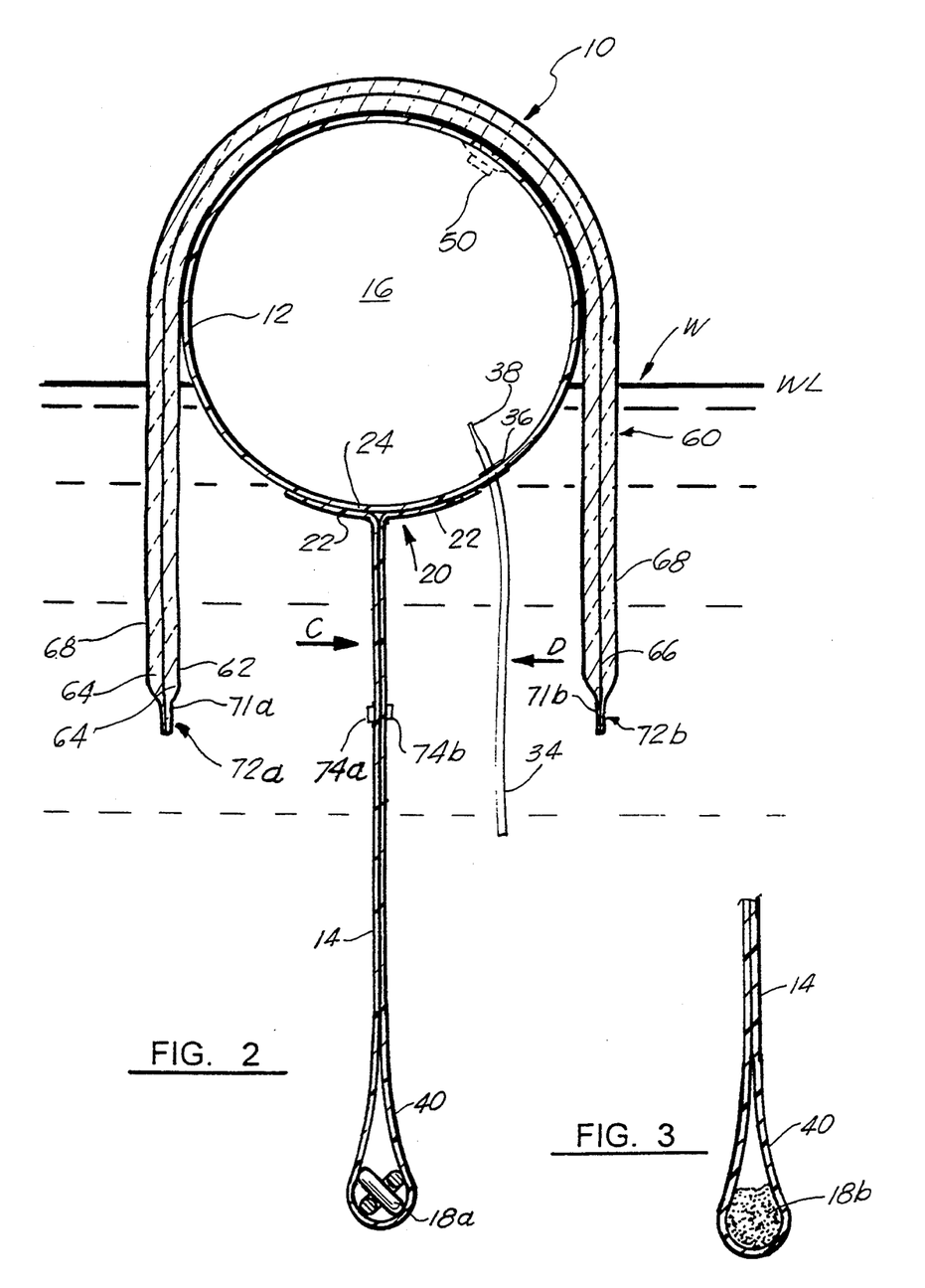
FIG. 2 is a cross-sectional end view of the embodiment of FIG. 1 taken along LINE 2—2 of FIG. 1, and illustrating the multiple layers of the heat-resistant barrier.
FIG. 3 is a cross-sectional end view of the lower portion of the skirt of the embodiment of FIG. 1, with an alternate ballast or bottom tensioning member.

Referring now to the drawing, and in particular FIGS. 1, 2, 4–7 and 9, the preferred embodiment of the apparatus of the present invention is designated generally by the numeral 10. The preferred embodiment of the apparatus of the present invention 10 is a high temperature or heat-resistant oil containment boom (also known in the trade as a "fireproof boom"). Boom 10 provides in its collapsed form, an elongated inflatable tube 12 formed of fluid impervious material, which is divided into compartments 16 along its length by transverse heat seals 15 (other means of compartmentalizing tube 12 are well-known and will be discussed further herein in the alternate embodiments of FIGS. 8; 10 and 11; and, 15 and 16). Secured to the lower portion 24 of tube 12, and extending along the length of tube 12, is skirt 14 which has connecting means 20 to secure it to tube 12. Skirt 14 is a tube formed of a fluid impervious material which can be sealed together along its upper portion 39, but remain separated at its lower portion 40. Connecting means 20 can take the form of end portions 22 of skirt 14, which can be heat sealed to the outside of the lower portion 24 of tube 12. Alternatively, tube 12 and skirt 14 can be integrally formed. The lower portion of skirt 14 forms a compartment 40 which runs the length of tube 12 and has provided therein, as best seen in FIG. 2, weight or ballast means 18 for maintaining tension in skirt 14 when boom 10 is deployed and inflated as will be discussed further herein. Ballast 18, in the preferred embodiment, takes the form of a heavy chain 18a; however, in an alternate embodiment as seen in FIG. 3, it can take the form of particulate matter 18b having a specific gravity substantially greater than that of water.

Figure 4:
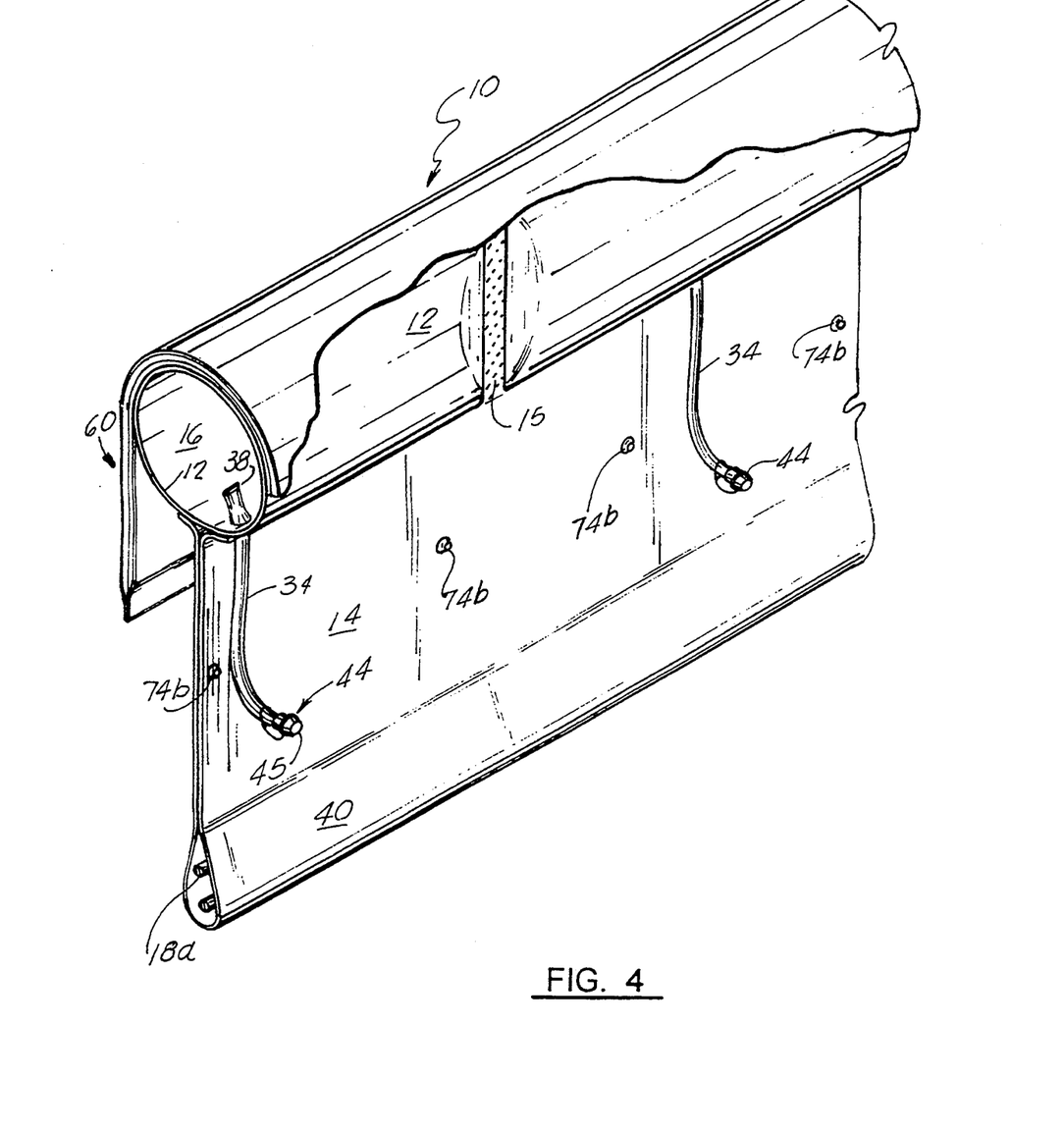
FIG. 4 is a perspective view of the embodiment of FIG. 1, with a portion of the heat-resistant barrier cut-away.
Figure 5:
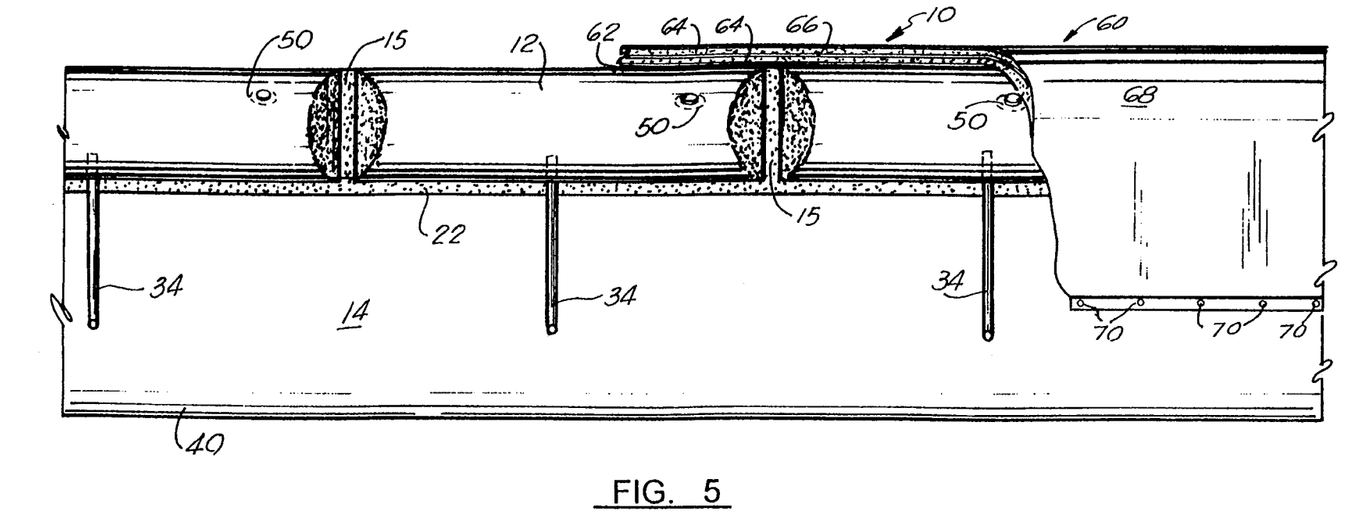
FIG. 5 is a side elevational view of the embodiment of FIG. 1 with a portion of the heat-resistant barrier cut-away and the distal end of each of the inflation tubes removed.
Figure 6:
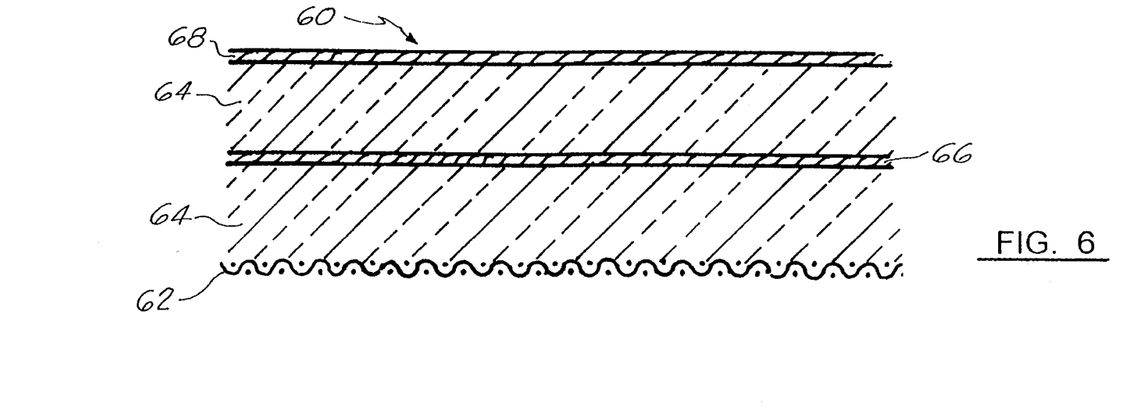
FIG. 6 is a partial, enlarged detailed cross-sectional view of the heat-resistant barrier or protective cover blanket for the apparatus of the embodiment of FIG. 1.
Figure 9:
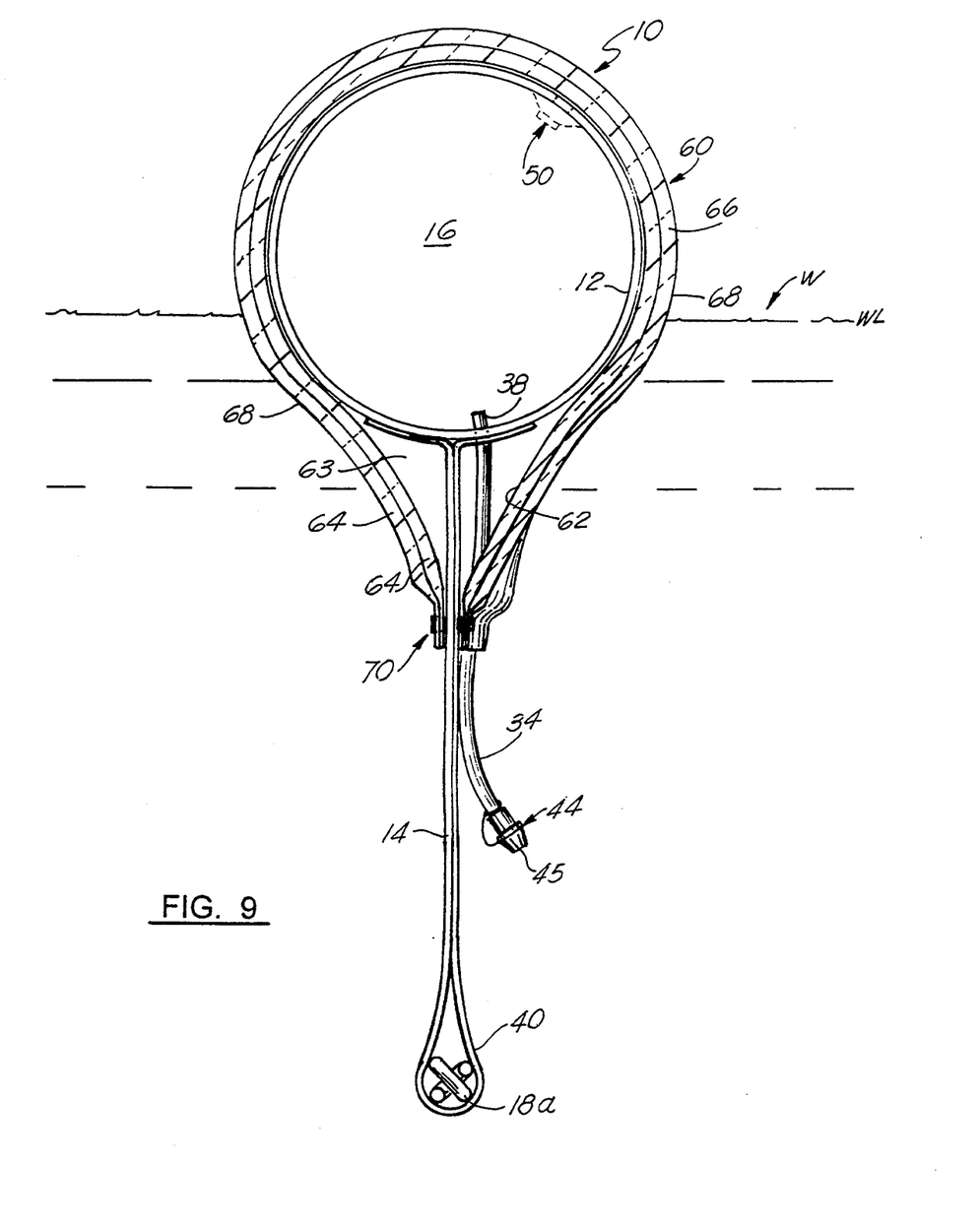
FIG. 9 is a cross-sectional view of the embodiment of FIG. 1 taken along LINE 2—2 of FIG. 1, with the high temperature or heat-resistant barrier or protective cover blanket fastened in place to the boom skirt.

Each of the compartments 16 of tube 34 have, as best seen in FIGS. 1, 2, 4, 5 and 9, tube or conduit 34 which pierces tube 12 at sealed aperture 36 so that pressurized gas can be supplied to independently inflate each of the compartments 16. Tubes 34 have at their proximate ends 38, a collapsible member. At the distal ends 44 of tubes 34, there are provided air-tight means so that there will not be flow out of the tube 34 after compartment 16 is inflated. This means can take the form of a conventional check valve or as best seen in FIGS. 1, 4 and 9, a cap 45 which is threadably and sealingly received on end portion 44 of tube 34.

Figure 7:
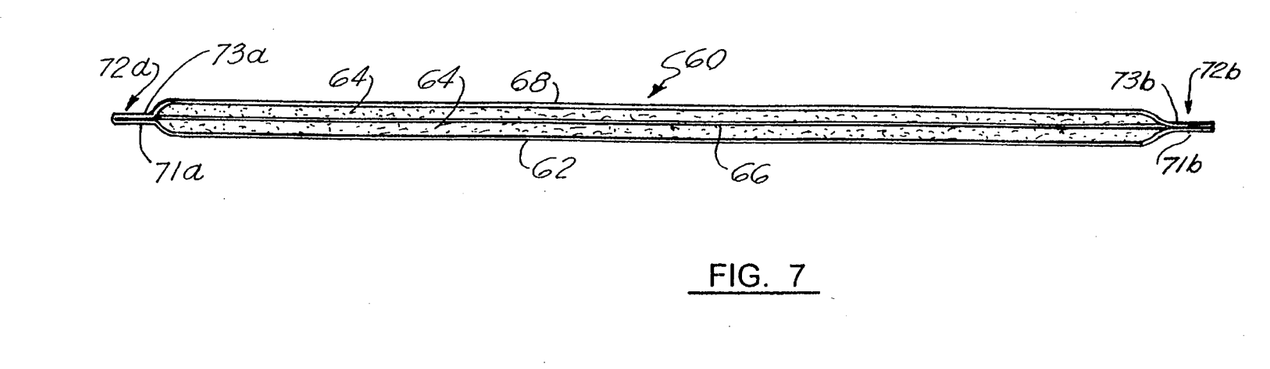
FIG. 7 is a cross-sectional view of the heat-resistant barrier or protective cover blanket of the embodiment of FIG. 1.

As best seen in FIGS. 1, 2, 4 and 9, boom 10 is provided with a protective cover or blanket 60. Cover 60 is fabricated by assembling the five layers best seen in the preferred embodiment of FIGS. 6 and 7. The assembly comprises bottom and top layers 62, 68 of a high temperature or heat-resistant polymer-coated material and middle layers of high temperature batt insulation 64. Preferably the two layers 64 are separated by a polymer-coated fabric 66 which prevents oil from soaking through and presenting a further fire hazard. The middle layers of insulation 64 and separating polymer-coated fabric 66 extend longitudinally along the entire length of bottom and top layers 62, 68, as best seen in FIG. 7. This assembly is formed into a blanket or sandwich by connecting, preferably by heat sealing, the longitudinal edges 71a, 71b with 73a, 73b of layers 62, 68, respectively. Provided in joined longitudinal edges 71a, 71b and 73a, 73b are a plurality of mating apertures 72a, 72b reinforced by metal rings to provide grommets which form part of the means 70 for fastening protective cover 60 to skirt 14 of boom 10 which will now be described further.

Figure 16:
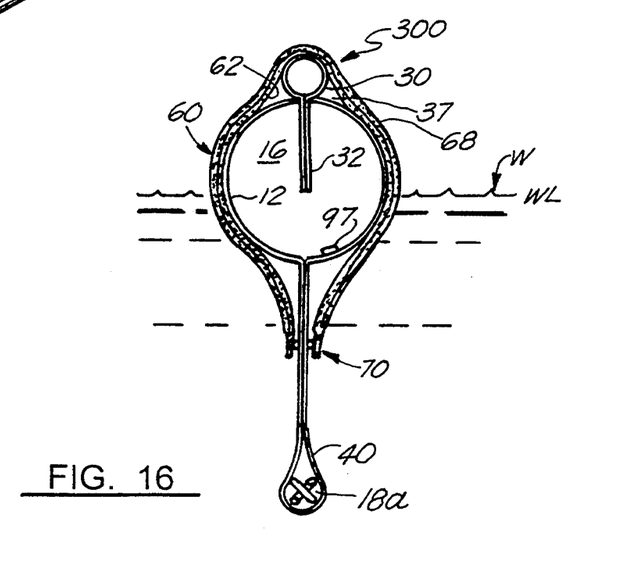
FIG. 16 is a cross-sectional view taken along LINE 16—16, of the embodiment of FIG. 15; and, FIG. 17 is a sectional view of a fourth alternate embodiment of an inflatable boom without a high temperature or heat-resistant barrier or protective cover blanket.

As best seen in FIGS. 1, 2 and 9, protective cover 60 is mounted on and secured to boom 10 by mounting it on tube 12 such that layer 62 rests upon the upper portion of tube 12 and so that longitudinal edges 71a, 71b substantially oppose each other on opposing sides of skirt 14. Skirt 14 is further provided with a series of opposing buttons or projections 74a, 74b evenly spaced along its length which when longitudinal edges 71a, 71b, respectively, are moved into engagement with skirt 14 in the direction of ARROWS C and D, respectively, as seen in FIG. 2, reinforced (by a metal ring or other conventional method) apertures or grommets 72a and 72b engage projections 74a, 74b and snap thereonto. This fastens longitudinal edges 71a, 71b, to skirt 14 to form fastening means 70 as best seen in FIG. 9 and the alternate embodiment of FIG. 16. Thus, as best seen in FIGS. 9 and 16, a fire burning on the surface of body of water "W" having a water level "WL" will be resisted by cover 60, thereby protecting boom 10.

As discussed above, compartments 16 of tube 12 are individually inflated via tubes 34. By this compartmentalization should a rupture occur in any one of compartments 16, the other compartments will remain inflated because of sealing means 15 and the boom will remain afloat.

Figure 17:
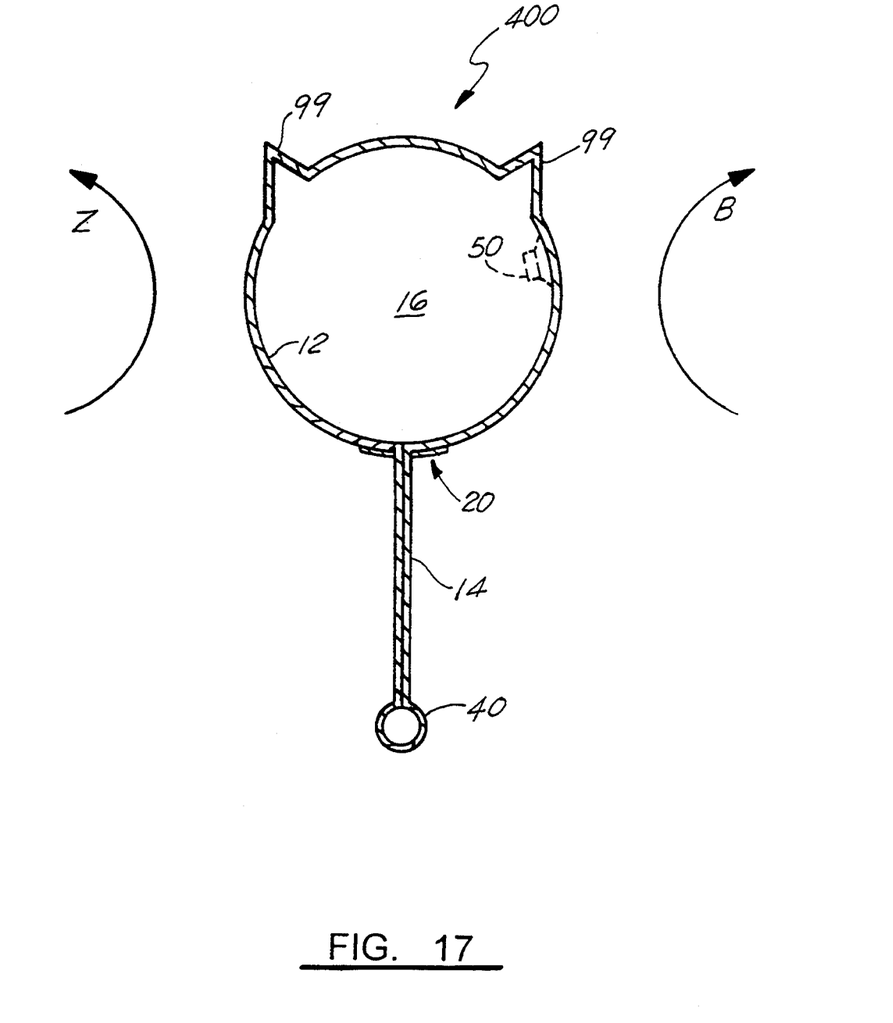

An alternate or secondary inflation and deflation means takes the form of a valve 50, best seen in FIGS. 2 and 9 and 17 (or valve 97 of the embodiment of FIG. 15), which, however, can only be employed by the removal of protective cover 60. The distinct advantage to inflation/deflation via inflation means 34, 36, 38, 44, 45 is that at least a portion of tube 34 and particularly end portion 44 is below the water level "WL" and extends below longitudinal edges 71a, 73a and 71b, 73b of protective cover 60 when it is fastened to boom 10. This positioning of the end portion 44 of tube 34 allows the body of water "W" to be the insulating medium for the end portion 44 of inflation/deflation means 34, 36, 38, 44, 45 and yet access is allowed to tube 34 at distal end 44 to inflate compartments 16 even though protective cover 60 has been installed, all as best seen in FIG. 9.

Figure 8:
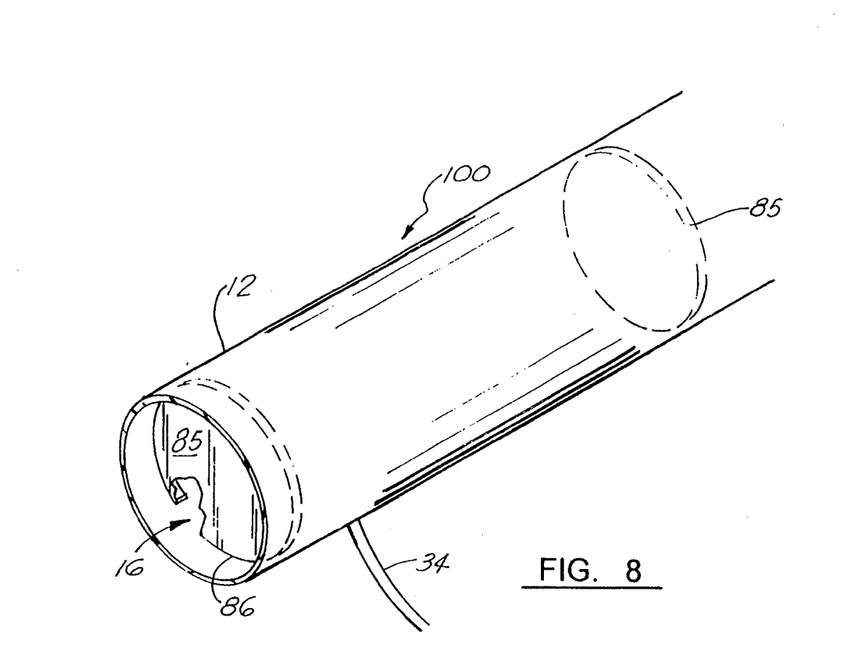
FIG. 8 is a perspective view, partially in section of an alternate embodiment of the inflatable barrier of the present invention with the high temperature or heat-resistant cover blanket or protective barrier removed therefrom, and the distal end portion of an inflation/deflation tube missing.

In a first alternate embodiment 100, best seen in FIG. 8, compartments 16 within tube 12 are separated by bulkheads or walls 85 which are sealingly attached at their peripheries 86 to the inside of tube 12 by a heat sealing process such as vulcanization or the like. In the alternative, bulkheads 85 can be integrally formed to the interior of tube 12.

Figures 10, 11, 12, 13, 14:
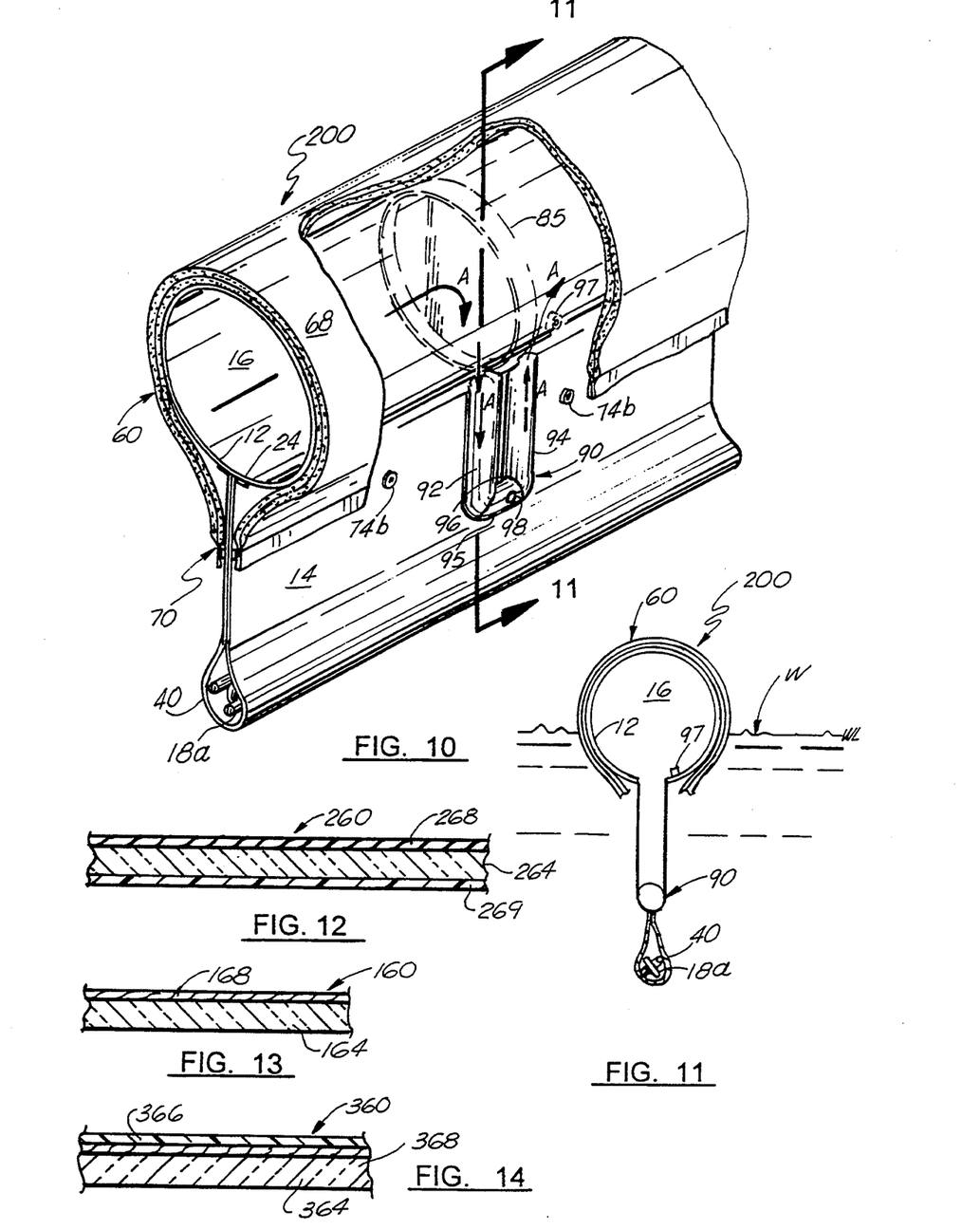
FIG. 10 is a perspective view, partially in section and partially cut-away, of a second alternate embodiment of the apparatus of the present invention.
FIG. 11 is a cross-sectional view taken along LINE 11—11 of the embodiment of FIG. 10, with the lower portion of the protective cover blanket omitted for clarity.
FIG. 12 is an alternate embodiment of the high temperature or heat-resistant barrier or protective cover blanket of the present invention.
FIG. 13 is a second alternate embodiment of the high temperature or heat-resistant barrier or protective cover blanket of the present invention.
FIG. 14 is a third alternate embodiment of the high temperature or heat-resistant barrier or protective cover blanket of the present invention.

In a second alternate embodiment 200, best seen in FIGS. 10 and 11, the compartmentalization of tube 12 is the same as the embodiment of FIG. 8. However, the boom is inflated in the manner illustrated in the assignee's earlier application Ser. No. 08/019,863. At the bottom or lower region 24 of tube 12 at each bulkhead 85 is provided a downwardly extending or depending exit channel 92 and a similarly downwardly extending or depending entry channel 94 at the opposite end thereof. These channels 92, 94 are preferably constructed of a flexible and impervious material that during use may be inflated and which during non-use may be collapsed. An impervious wall 96 separates the adjacent depending channels 92, 94 of adjacent compartments 16. At the bottom or lower end region of each depending channel union 92, 94 is a passageway 95 which connects the lower end regions of exit channel 92 to corresponding lower end region of the adjacent entry channel 94. In this fashion, the fluid (flowing in the direction of ARROWS A) which inflates compartments 16 can pass from one such compartment to the next or adjacent one, thereby providing a means of supplying the inflating medium (i.e., pressurized air to each compartment 16 of tube 12 in succession). Passageway 95 contains a valve 98 by which inflation can be accomplished when boom 10 is deployed. It can best be seen in FIG. 11 that inflation means 90 is positioned below blanket 60 and below water level "WL" when deployed and it is, therefore, insulated by water "W" from any fire at the surface.

Figure 15:
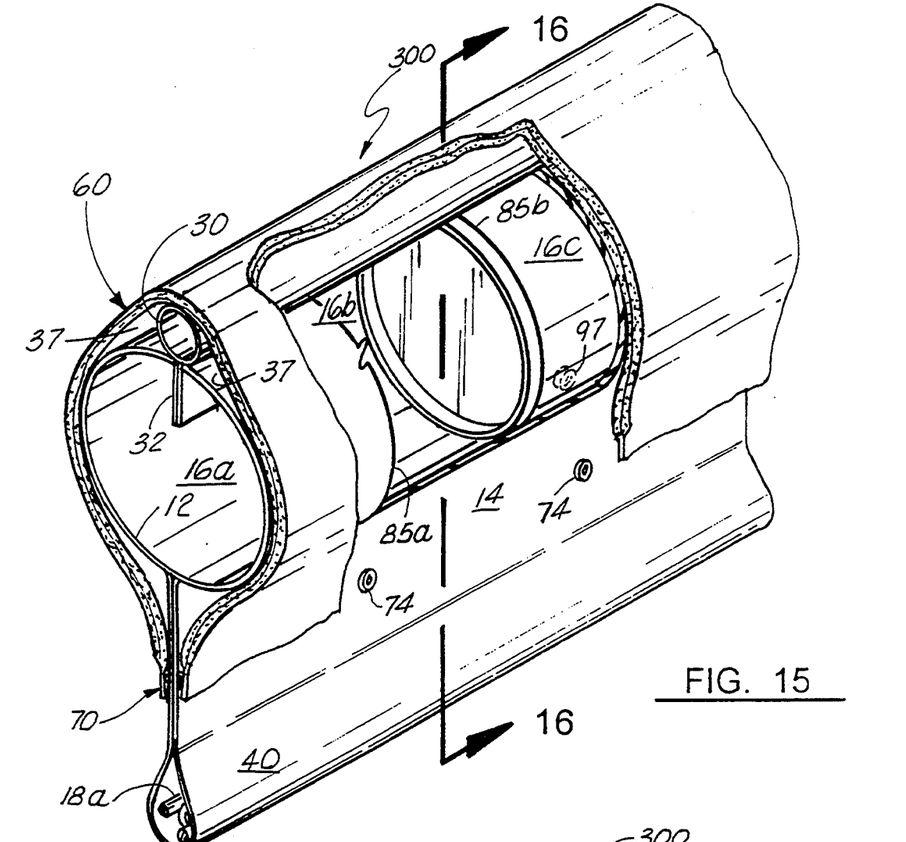
FIG. 15 is a perspective view, partially in section and partially cut-away, of a third alternate embodiment of the apparatus of the present invention.

A third alternate embodiment 300 of the present invention, best seen in FIGS. 15 and 16, provides for the compartmentalization of tube 12 in the manner illustrated in FIGS. 8, 10 and 11 yet with inflation means 30, 32 best described in the assignee's prior U.S. Pat. Nos. 5,022,785 and 5,195,844 (see FIGS. 2 and 5 thereof). Here the inflation of individual compartments 16 is accomplished by incorporation in boom 10 the structure of a longitudinally extending collapsible tube 30 which is provided with a plurality of transversely disposed connecting tubes 32 which respectively extend into each of compartments 16 (16a, 16b, 16c, etc., separated by bulkheads 85a, 85b, 85c, etc., respectively).

When this type of boom is deployed into the water, the inflation of the longitudinally adjacent compartments 16 is accomplished by applying pressurized air to one end of small diameter tube 30. Such pressurized air is supplied to the transverse connecting tubes 32 to each of the longitudinally adjacent sealed compartments 16 thus effecting inflation of these compartments so long as the fluid pressure is maintained in small tube 30. The skirt 14 is formed in the same manner as previously described in connection with the other embodiments and has compartment 40 and a ballast means 18 therein.

Once blanket 60 is mounted over boom 10, there is created a spaces 37 between blanket 60 and tube 12.

In a fourth alternate embodiment of FIG. 17, boom 400 comprises tube 12 compartmentalized in the manner discussed above to form compartments 16 and have depending skirt 14. A valve 50 as described above is provided in each compartment 16 so that each such compartment can be independently inflated. No cover blanket 60 is provided, but symmetrically placed upwardly projecting fins 99 are provided on opposed sides of the upper portion of tube 12 in the area of each compartment 16. These projecting fins 99 act as means for deflecting heat currents from a fire on the surface from the boom 400. The deflection pattern being represented generally by ARROWS B and Z.

Alternate embodiments of "fireproof" blanket 60 can also be employed with the various boom configurations. As best seen in FIG. 13, blanket 160 can simply provide an outer layer 168 of metallic cloth fabric comprised of stainless steel or titanium or other metal connected to a second layer of high temperature resistant refractory fibrous batt insulation 164. In this embodiment, there would be no other layer. The top layer 168 would be resistant to high temperatures and the second insulating layer 164 protects boom 10.

In the second alternate embodiment 260 of the blanket cover of the present invention, is best seen in FIG. 12 and three layers are provided. The outer layer 268 being of metallic cloth fabric such as in the embodiment of FIG. 13 and the second layer being a high temperature resistant batt insulation 264 such as the aforementioned embodiment 160, and, the bottom or third layer 269 being of a woven fabric or thermoplastic.

In the third alternate embodiment 360 of the blanket cover, best seen in FIG. 14, three layers are again provided but in a different arrangement. The outer layer 366 is of a polymer-coated material; the second or inner layer 368 of a metallic cloth fabric such a described in the embodiments 160, 260 of FIGS. 12 and 13; and, a third layer 364 of a high temperature resistant insulation such as described in the embodiments 160, 260 of FIGS. 12 and 13.

All of the alternate embodiments 160, 260 and 360 can be used in conjunction with the various configurations of boom (10, 100, 200, 300).

Because many varying and differing embodiments may be made within the scope of the inventive concept herein taught and because many modifications may be made in the embodiment herein detailed in accordance with the descriptive requirement of the law, it is to be understood that the details herein are to be interpreted as illustrative and not in a limiting sense.

What is claimed as invention is:

1. A high temperature resistant inflatable oil containment boom comprising a flat elongated collapsible tube formed of a fluid impervious material and having a protective cover extending substantially the full length of said boom, said cover comprising, in laminar combination, a top layer of high temperature resistant metallic fabric and a bottom layer of high temperature resistant insulation surrounding said boom, said protective cover being unified by having said top and said bottom layers secured together along their length along their peripheral edges.

2. The boom of claim 1, further comprising a bottom layer of woven fabric wherein said high temperature resistant insulation layer is now intermediate said metallic fabric and said woven fabric.

3. The boom of claim 1, further comprising a bottom layer of thermoplastic material wherein said high temperature resistant insulation layer is now intermediate said metallic fiber and said thermoplastic material.

4. A high temperature resistant inflatable oil containment boom comprising a flat elongated collapsible tube formed of a fluid impervious material and having a protective cover extending substantially the full length of said boom, said cover comprising, in laminar combination, a top layer of a polymer coated material, a middle layer of high temperature resistant metallic fabric and a bottom layer of high temperature resistant insulation, said protective cover being unified by having at least said top layer and said bottom layer secured together along their peripheral edges.

5. A high temperature resistant inflatable oil containment boom formed of a fluid impervious material and having a protective cover extending substantially the full length of said boom, said cover comprising, in laminar combination, an outer layer of high temperature resistant metallic fabric, a first underlayer of high temperature resistant insulation, a second underlayer of a polymer-coated fabric, a third underlayer of said high temperature resistant insulation and a bottom layer of a high temperature resistant polymer-coated material, said protective cover being unified by having at least said top and bottom layers secured together along their peripheral edges.

6. The boom of claim 5, wherein said metallic fabric is wire mesh.

7. The apparatus of claim 1, wherein said boom further comprises a flat reelable elongated skirt secured to said tube therealong and having means for weighting extending substantially along the length of said skirt.

8. The apparatus of claim 7, wherein said protective cover encases said tube and is secured at its peripheral edges to the opposing sides of said depending skirt.

9. The apparatus of claim 8, further comprising means for inflating said tube, said means positioned to communicate with said tube on the underside thereof, whereby said means extends below said securement of said cover to said skirt and thereby below the water line when said boom is inflated and deployed in a body of water.

10. The apparatus of claim 5, wherein said boom further comprises a flat reelable elongated skirt secured to said tube therealong and having means for weighting extending substantially along the length of said skirt.

11. The apparatus of claim 10 wherein said protective cover encases said tube and is secured at its peripheral edges to the opposing sides of said depending skirt.

12. The apparatus of claim 11, further comprising means for inflating said tube, said means positioned to communicate with said tube on the underside thereof, whereby said means extends below said securement of said cover to said skirt and thereby below the water line when said boom is inflated and deployed in a body of water.

13. A flexible inflatable float boom for confining a material floatable on a liquid surface comprising:
 (a) a plurality of sealed inflatable buoyancy chambers sequentially secured together;
 (b) impervious channel means communicating with and extending downwardly from each of said buoyancy chambers for providing access to each of said buoyancy chamber;
 (c) passageway means for coupling a lower end region of a said channel means of one of said buoyancy chambers with a lower end region of a said channel means of its adjacent said buoyancy chamber, said passageway means and said channel means providing for the passage of a pressurized inflating medium therethrough into said buoyancy chambers;
 (d) ballast means secured to said float boom underneath said buoyancy chambers for maintaining said boom in a proper orientation when deployed,
 (e) means for blocking access to a said buoyancy chamber whenever the internal pressure within its respective said channel means is less than the external hydrostatic pressure acting upon the said channel means; and,
 (f) a protective cover mounted over said chambers to encase the same, said cover having its peripheral edges adapted to be secured to opposing sides of a portion of said ballast means.

14. The apparatus of claim 13, further comprising means for inflating said chambers, said means positioned to communicate with said chambers on the underside thereof, whereby said means extends below said securement of said cover to said ballast means and thereby below the water line when said boom is inflated and deployed in a body of water.

* * * * *